United States Patent
Samejima

(10) Patent No.: US 8,284,578 B2
(45) Date of Patent: Oct. 9, 2012

(54) POWER SUPPLY APPARATUS

(75) Inventor: Keisuke Samejima, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/719,749

(22) Filed: Mar. 8, 2010

(65) Prior Publication Data

US 2010/0238688 A1    Sep. 23, 2010

(30) Foreign Application Priority Data

Mar. 19, 2009  (JP) ................................ 2009-069008

(51) Int. Cl.
*H02M 3/24*  (2006.01)
*H02M 3/335*  (2006.01)

(52) U.S. Cl. ..................... 363/79; 363/21.01; 363/21.12; 363/97

(58) Field of Classification Search .................... 363/16, 363/21.01–21.18, 34, 79, 80, 97
See application file for complete search history.

(56) References Cited

U.S. PATENT DOCUMENTS

| | | | |
|---|---|---|---|
| 6,195,271 B1 | 2/2001 | Suzuki et al. | |
| 6,366,481 B1 | 4/2002 | Balakrishnan | |
| 6,975,521 B1 | 12/2005 | Konno | ........................ 363/21.08 |
| 7,245,087 B2 * | 7/2007 | Nishikawa et al. | ........... 315/224 |
| 7,394,670 B2 * | 7/2008 | Koike | ......................... 363/21.16 |
| 7,773,393 B2 * | 8/2010 | Choi | ........................... 363/21.12 |
| 7,859,864 B2 * | 12/2010 | Shiroyama | ................. 363/21.12 |
| 2001/0030530 A1 | 10/2001 | Marty | |
| 2010/0149840 A1 | 6/2010 | Hayasaki et al. | .......... 363/21.09 |
| 2010/0176907 A1 | 7/2010 | Hayasaki et al. | ............. 336/220 |

FOREIGN PATENT DOCUMENTS

| | | |
|---|---|---|
| CN | 1133508 A | 10/1996 |
| JP | 10-108457 A | 4/1998 |
| JP | 2000-148265 | 5/2000 |
| JP | 2002-354801 | 12/2002 |
| JP | 2006-109543 | 4/2006 |

OTHER PUBLICATIONS

Chinese Office Action dated Jun. 26, 2012 issued in corresponding Chinese Patent Application No. 201010135769.6.
Korean Office Action dated May 30, 2012 issued in corresponding Korean Patent Application No. 10-2010-0022577.
Kim, G. T., Single Step PFC Converter (1), The Korean Institute of Illuminating and Electrical Instruction Engineers, pp. 30-43, 2007.

* cited by examiner

*Primary Examiner* — Jessica Han
(74) *Attorney, Agent, or Firm* — Fitzpatrick, Cella, Harper & Scinto

(57) ABSTRACT

The DC power supply apparatus includes a switching operation control part that is provided between a current detection part to detect a current flowing through a primary coil of a transformer and a control part to control the operation of a switching part and controls the operation of the switching part according to an output voltage so that consumption power in a low-load state can be further reduced.

4 Claims, 12 Drawing Sheets

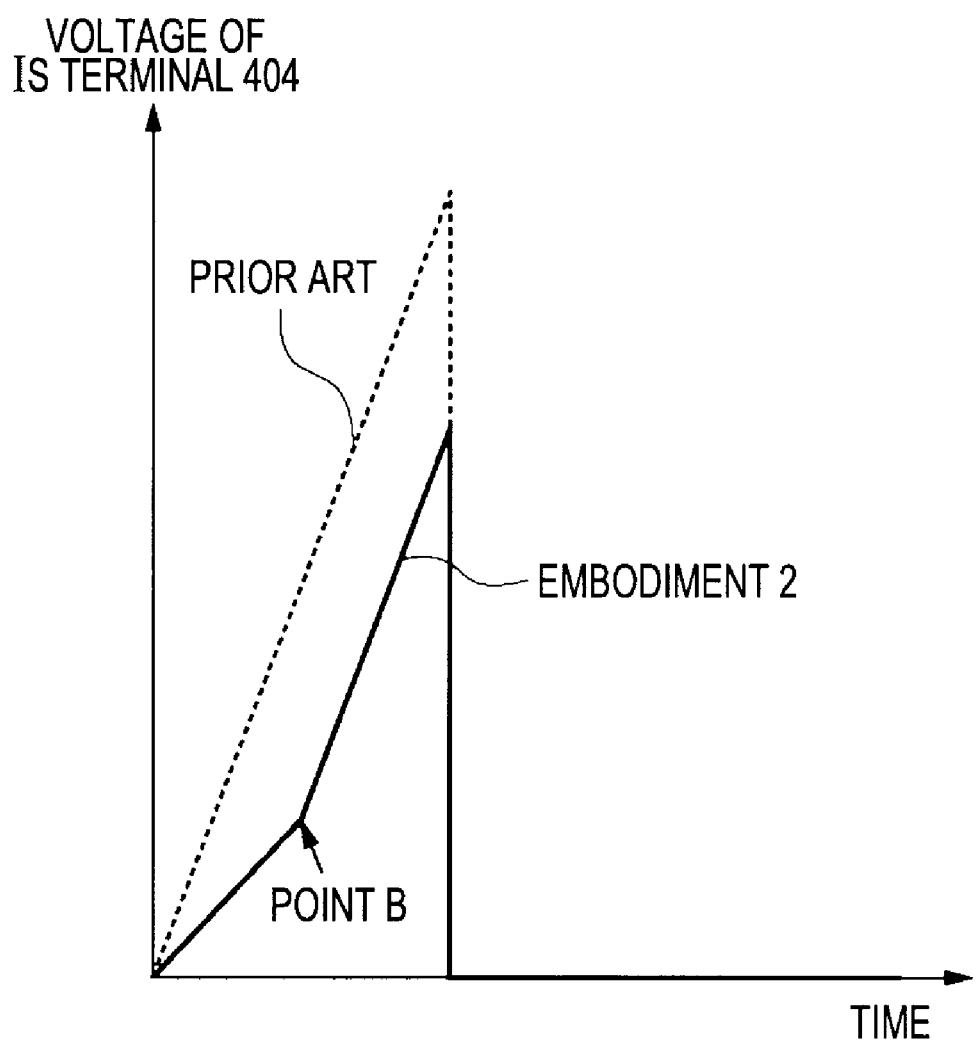

us 8,284,578 B2

POWER SUPPLY APPARATUS

BACKGROUND OF THE INVENTION

1. Field of the Invention

The present invention relates to a DC power supply apparatus and more particularly, to a DC power supply apparatus that reduces consumption power in a low-load state.

2. Description of the Related Art

In a switching power supply of a flyback system that is a DC power supply apparatus in the related art, a switching operation of a field effect transistor (hereinafter, simply referred to as FET) that functions as a switching element to switch a primary voltage of a flyback transformer is controlled as follows. For example, ON/OFF of the switching FET is controlled based on a voltage corresponding to a secondary output voltage, a voltage corresponding to a current flowing through the FET, and a drain/source voltage of the FET. Specifically, the FET is turned on using a known power control IC, under the condition that the voltage corresponding to the secondary output voltage exceeds a first reference voltage and the drain/source voltage of the FET is a second reference voltage or lower. Meanwhile, the FET is turned off, under the condition that the voltage corresponding to the secondary output voltage becomes lower than the voltage corresponding to the current flowing through the FET.

In this DC power supply apparatus, for example, as disclosed in Japanese Patent Application Laid-Open No. 2000-148265, an ON period of the FET in a low-load state is shortened to reduce the consumption power in the low-load state.

However, in the DC power supply apparatus according to the related art, since a switching frequency (the number of times) of the switching FET is maintained, there is a limitation in the reduction of the consumption power in the low-load state.

The reduction of the consumption power in the low-load state becomes one of serious problems to be resolved in an electronic system that is equipped with the DC power supply apparatus. For example, when the operation of the electronic apparatus that is equipped with the DC power supply apparatus is in a waiting state, that is, when the electronic apparatus is in the low-load state, the consumption power can be reduced. Therefore, power of the electronic apparatus can be saved. That is, a user can further reduce consumption power at the time of using the electronic apparatus, thereby reducing a cost generated when the electronic apparatus is used. For this reason, it has been increasingly required to reduce the consumption power of the DC power supply apparatus in the low-load state.

SUMMARY OF THE INVENTION

Accordingly, the purpose of preset invention is to further reduce consumption power in a low-load state, in a DC power supply apparatus.

Another purpose of the present invention is to provide a DC power supply apparatus including a transformer, a switching part that controls a current flowing through a primary coil of the transformer, a current detection part that detects the current flowing through the primary coil of the transformer, a voltage output part that rectifies and smoothens a voltage of a secondary coil of the transformer and outputs the voltage, a detection part that detects a regeneration termination of the secondary coil; a comparison part that compares an output voltage from the voltage output part and a reference voltage and outputs a signal according to the comparison result, a control part that turns on the switching part based on the detection result of the detection part and an output from the comparison part and turns off the switching part based on an output from the current detection part and the output from the comparison part; and a switching operation control part that is provided between the current detection part and the control part and controls the operation of the switching part according to the output voltage.

A further purpose of the present invention will become apparent from the following description of exemplary embodiments with reference to the attached drawings.

BRIEF DESCRIPTION OF THE DRAWINGS

FIG. 9 is a diagram illustrating a comparison result of voltage waveforms of IS terminals 404 according to the related art and the second embodiment in a normal load state.

DESCRIPTION OF THE EMBODIMENTS

Hereinafter, the configuration and operation of the present invention will be described. In this case, specific embodiments will be described after the configuration and operation of the related arts are described. However, it is to be understood that the disclosed embodiments are only exemplary and a technical scope of the present invention is not limited to the disclosed exemplary embodiments.

<Example of the Configuration and Operation of a DC Power Supply Apparatus According to the Related Art>

Figure 12A:
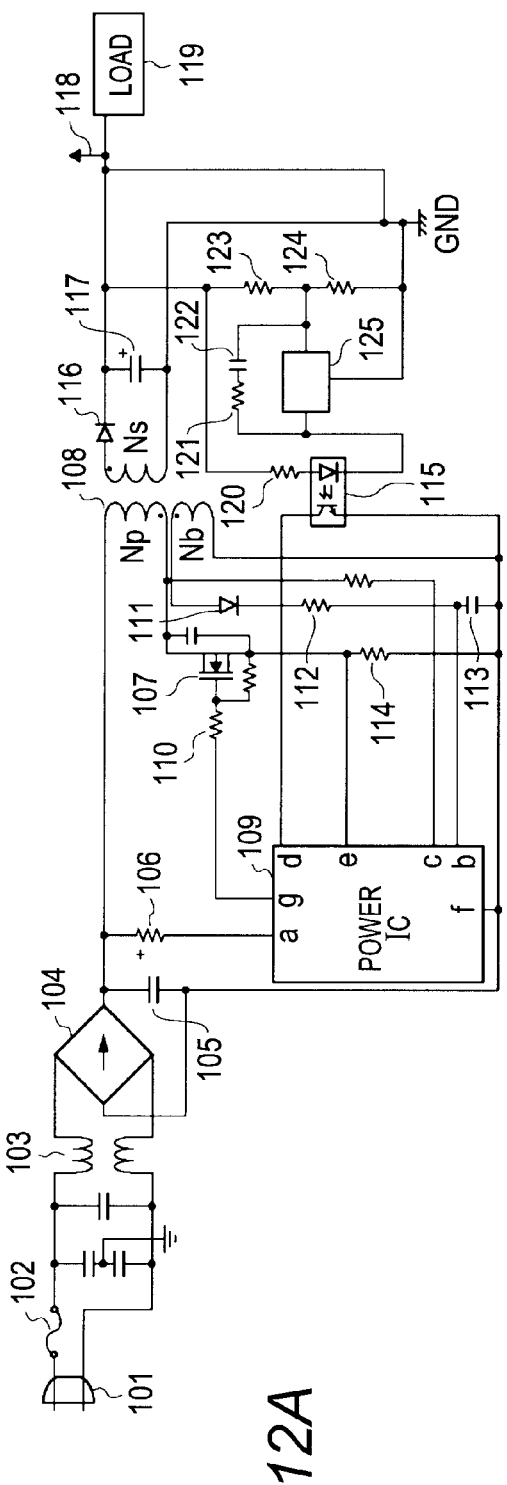
FIG. 12A is a diagram illustrating an example of a schematic circuit of a power supply apparatus according to the related art, which illustrates the entire configuration of a DC power supply apparatus.

First, in order to make a feature of the DC power supply apparatus according to this embodiment to clear, the configuration and operation of the DC power supply apparatus according to the related art will be described with reference to FIGS. 12A to 13. FIG. 12A illustrates the outline of a circuit of the DC power supply apparatus according to the related art. The DC power supply apparatus that will be described herein is a switching power supply of a flyback system.

In FIG. 12A, a circuit that generates a primary direct-current voltage has an inlet 101, a fuse 102, a common mode coil 103, a rectifier diode bridge 104, a primary smoothing electrolytic capacitor 105, and a start-up resistor 106. A circuit that controls switching of the primary direct-current voltage has a field effect transistor (hereinafter, simply referred to as FET) that is an example of a switching element 107, a transformer 108, a power control IC 109 that is a power control circuit, a gate resistor 110 of the FET, a diode 111, a resistor 112, a capacitor 113, a current detection resistor 114 that constitutes a current detection circuit to convert a current flowing through a primary coil into a voltage value, and a photo coupler 115 that constitutes a transmission circuit. Interruption of the current that flows through the primary coil of the transformer is controlled by the FET 107. Meanwhile, a circuit that is related to a secondary direct-current voltage has a diode 116, a smoothing capacitor 117, a DC voltage output 118, and a load 119 that is connected to the DC power supply apparatus. The diode 116 and the smoothing capacitor 117 constitute a rectifying/smoothing circuit. A circuit that detects the secondary direct-current voltage has a resistor 120, phase warrant circuits 121 and 122 composed of a capacitor and a resistor, regulation resistors 123 and 124, and a shunt regulator 125.

In a normal operation, commercial AC power that is input from the inlet 101 is full-wave rectified through the rectifier diode bridge 104 and is charged as a DC voltage in the primary smoothening electrolytic capacitor 105. The DC voltage starts the power control IC 109 through the start-up resistor 106. If the power control IC 109 starts and the switching FET 107 enters in a conductive state, the DC voltage of the primary smoothing capacitor 105 is applied to a primary coil Np, and a voltage that uses the side of the same polarity as the primary coil Np as a positive polarity is induced in an auxiliary coil Nb. At this time, a voltage is induced in a secondary coil Ns. However, since the voltage is a voltage that uses an anode side of the diode 116 as a negative polarity, the voltage is not transmitted to the secondary side. Accordingly, the current that flows through the primary coil Np is only an excitation current of the transformer 108, and energy that is proportional to the square of the excitation current is accumulated in the transformer 108. The excitation current increases proportional to a time. The voltage that is induced in the auxiliary coil Nb charges the capacitor 113 through the diode 111 and the resistor 112 and a power supply voltage is supplied to the power control IC 109.

Next, if the FET 107 enters in a non-conductive state, a voltage that has a polarity reversed to the polarity at the time of starting is induced in each coil of the transformer 108, and a voltage that uses the anode side of the diode 116 as a positive polarity is induced in the secondary coil Ns. The energy that is accumulated in the transformer 108 is rectified and smoothed by the diode 116 and the smoothing capacitor 117 and becomes the DC voltage output 118, and is supplied to the load 119. As such, when the transformer 108 is operated, the voltage that is generated by the auxiliary coil Nb of the transformer is supplied as power of the power control IC 109. This enables the power control IC 109 to be continuously operated, thereby causing the FET 107 to continuously perform the switching operation. Therefore, the transformer 108 can continuously perform the stable operation.

The voltage control of the DC voltage output 118 is performed as follows. First, a voltage that is obtained by dividing the DC voltage output 118 by the regulation resistors 123 and 124 is input to the shunt regulator 125 accompanied by phase compensation circuits 121 and 122. A feedback signal according to an input voltage level is generated and is fed back to the power control IC 109 through the photo coupler 115. The stabilized DC voltage control is enabled by the power control IC 109 performing the switching control of the FET 107 based on the feedback signal.

Next, the operation of the FET that works as a core of the DC power supply apparatus described in the operation outline and operates and the power control IC that controls the FET will be described in detail. In this case, the power control IC that is the general power control IC described above and operates under the condition of frequency non-fixation mode, duty non-fixation mode, and a current control mode will be described.

Figure 12B:
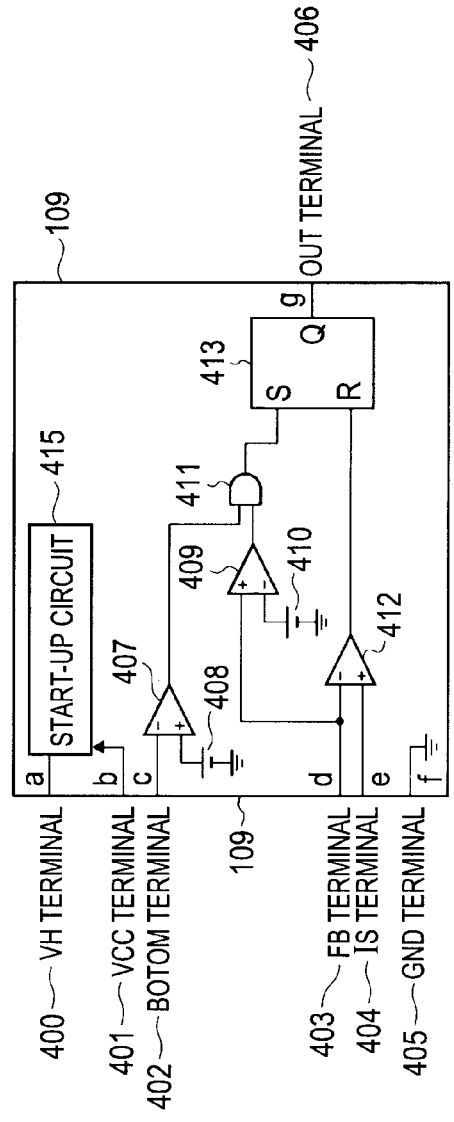
FIG. 12B is a diagram illustrating an example of a schematic circuit of the power supply apparatus according to the related art, which illustrates a configuration example of a power control IC 1.

In the power control IC 109 of FIG. 12A, individual terminals are denoted by reference characters a to g. A configuration example of the power control IC 109 where terminal names are clearly expressed is illustrated in FIG. 12B. As illustrated in FIG. 12B, the power control IC 109 has a start-up (VH) terminal 400 of start-up circuit 415 of the power control IC, a power supply voltage (Vcc) terminal 401 that supplies power to the power control IC, a BOTOM terminal 402, an FB terminal 403, an IS terminal 404, a GND terminal 405 of the power control IC, and an OUT terminal 406. In the power control IC 109, comparators 407, 409, and 412 that compare inputs and amplify the inputs, reference voltage sources 408 and 410, an AND circuit 411, and an RS flip-flop logic circuit 413 constitute a circuit.

Hereinafter, functions of the main components that are illustrated in the block diagram of the power control IC 109 will be described. First, the individual terminals of the power control IC 109 will be described.

Start-up terminal 400(a): provide a primary voltage to the start-up circuit of the power control IC.

Power supply voltage terminal 401(b): a voltage input part that works as a power supply of the power control IC.

BOTOM terminal 402(c): a terminal that monitors a drain/source voltage Vds of the FET 107. A regeneration termination of the secondary coil is detected by the drain/source voltage Vds.

FB terminal 403(d): a feedback terminal of the detection result of the secondary voltage. That is, the FB terminal is a terminal that inputs a change in voltage of the DC voltage output 118 through the photo coupler 115.

IS terminal 404(e): a terminal that monitors a current Id flowing through the FET 107. Further, the IS terminal has a function of stopping the oscillation operation of the power control IC, if the corresponding voltage exceeds a predetermined voltage.

GND terminal 405(f): a GND terminal part of the power control IC.

OUT terminal 406(g): a terminal that is connected to a gate terminal of the FET 107.

Next, the individual components of the power control IC 109 will be described.

Comparator 407: outputs a high signal to the AND circuit 411, when the voltage of the BOTOM terminal 402 falls lower than a reference voltage 408. The comparator 407 constitutes a reset detection circuit that detects the regeneration termination of the secondary coil.

Comparator 409: outputs a high signal to the AND circuit 411, when the voltage of the FB terminal 403 exceeds the reference voltage 408. The comparator 409 constitutes an error amplifying circuit that compares a secondary output voltage and the reference voltage and amplifies the voltages.

AND circuit 411: outputs a high signal to a set terminal (S) of the RS flip-flop logic circuit 413, only when both an output from the comparator 407 and an output from the comparator 409 are at a high level.

Comparator 412: compares voltages input from the FB terminal 403 and the IS terminal 404, and outputs a high signal to a reset terminal (R) of the RS flip-flop logic circuit 409, when the voltage of the IS terminal 404 is high.

RS flip-flop logic circuit 413: a general RS flip-flop logic circuit.

Start-up circuit 415: circuit that starts the power control IC 109, when the primary voltage is provided.

Figure 13:
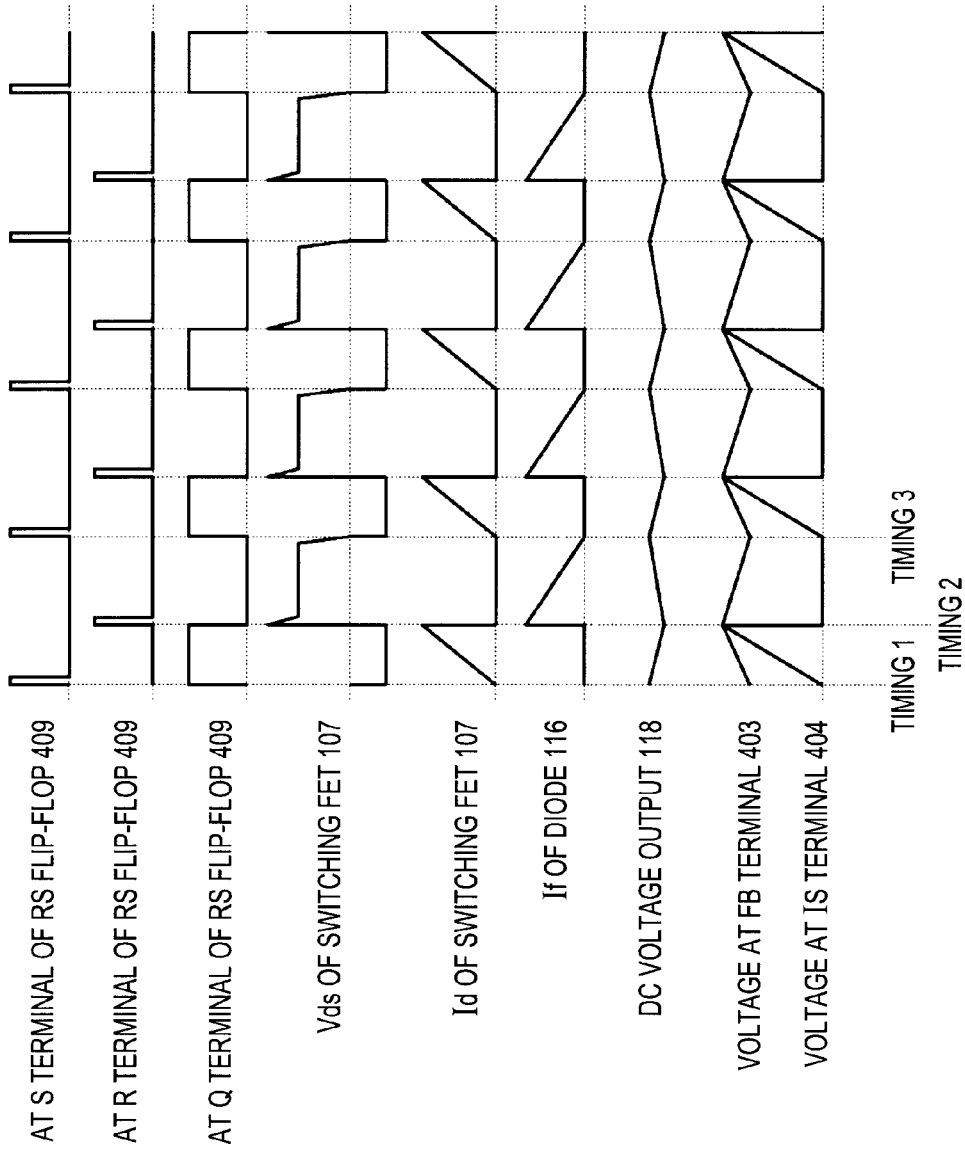
FIG. 13 is a diagram illustrating an operation waveform of the power supply apparatus according to the related art.

The outline of an operation waveform in the DC power supply apparatus that uses the power control IC 109 having the above-described configuration is illustrated in FIG. 13. The operation of the power control IC 109, the FET 107, the transformer 108, and the diode 116 in the DC power supply apparatus according to the related art will be mainly described using FIGS. 12 and 13.

(Timing 1) It is assumed that a current state is a state of timing 1 of FIG. 13. That is, the current timing is timing immediately after the FET 107 enters in a conductive state. At this time, the drain current Id of the FET 107 linearly increases. As a result, energy is accumulated in the transformer 108 by the drain current Id of the FET 107. Since a potential that is generated in the secondary coil Ns is a potential that causes the diode 116 to be inversely biased, a current If does not flow through the diode 116. For this reason, the DC voltage output 118 decreases. The voltage of the FB terminal 403 gradually increases through the photo coupler 115. The voltage of the IS terminal 404 also linearly increases, similar to the drain current Id of the FET 107.

(Timing 2) Timing when the voltage of the IS terminal 404 becomes higher than the voltage of the FB terminal 403 is a trigger that causes the state to transition to a state of timing 2. At this timing, an R terminal of the RS flip-flop logic circuit 409 becomes high, a Q terminal of the RS flip-flop logic circuit 409, that is, the OUT terminal 406 of the power control IC 109 becomes low, and the FET 107 enters in a non-conductive state and is turned off. For this reason, the drain current Id of the FET 107 does not flow. The diode 116 is positively biased by the potential generated in the secondary coil Ns and enters in a conductive state. The energy that is accumulated in the insulated transformer 108 starts to flow as the current If of the diode 116, and the DC voltage output 118 increases. For this reason, the voltage of the FB terminal 403 gradually decreases through the photo coupler 115. The voltage of the IS terminal 404 decreases at the same time as the stop of the supply of the drain current Id of the FET 107.

(Timing 3) Timing when the voltage of the BOTOM terminal 402 becomes the reference voltage 408 or lower and the voltage of the FB terminal 403 becomes higher than the reference voltage 410 is a trigger that causes the state to transition to a state of timing 3. At this timing, a high signal is input from the AND circuit 411 to an S terminal of the RS flip-flop logic circuit 413, the Q terminal of the RS flip-flop logic circuit 409, that is, the OUT terminal 406 of the power control IC 109 becomes high, and the FET 107 enters in a conductive state. Since the timing 3 is the timing 1 of a next cycle, a series of operation cycles is repeated.

As such, the series of operations of the general DC power supply apparatus (power control IC: operates under the condition of the frequency non-fixation mode, the duty non-fixation mode, and the current control mode) is performed.

Next, the first embodiment that has a configuration based on the above-described configuration will be described.

Figure 1A:
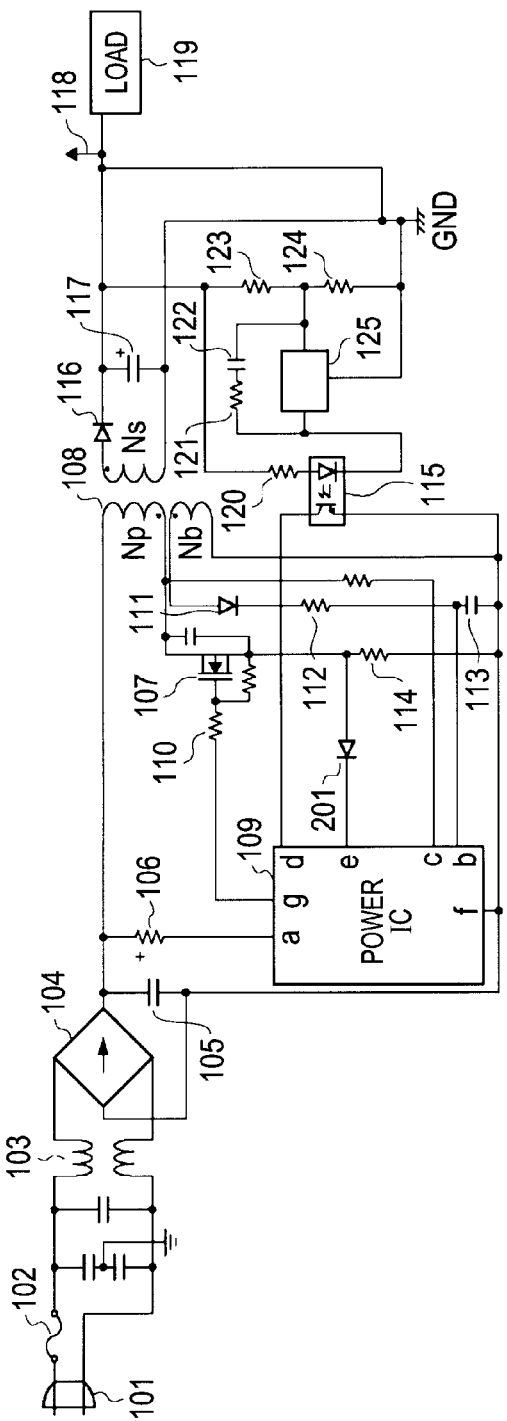
FIG. 1A is a diagram illustrating an example of a schematic circuit of a power supply apparatus according to a first embodiment, which illustrates the entire configuration of a DC power supply apparatus.
Figure 1B:
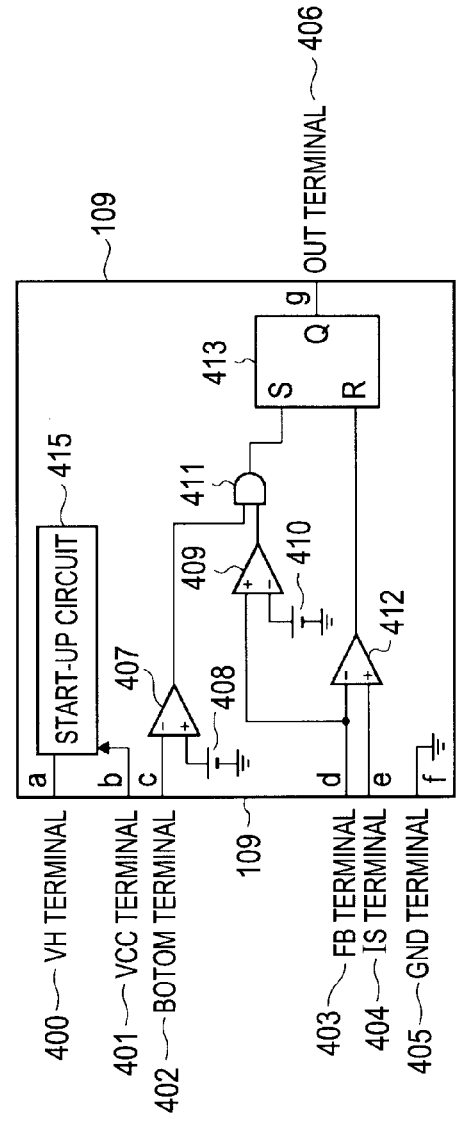
FIG. 1B is a diagram illustrating an example of a schematic circuit of the power supply apparatus according to the first embodiment, which illustrates a configuration example of a power control IC 1.

FIGS. 1A and 1B illustrate an example of the circuit configuration of the DC power supply apparatus according to the first embodiment. Specifically, FIG. 1A illustrates the entire configuration of the DC power supply apparatus and FIG. 1B illustrates a configuration example of the power control IC 109. Since the configuration of the power control IC 109 is the same as that of FIG. 12B illustrated in the related art, the detailed description thereof will be omitted. The description of the same configuration as that of FIG. 12A will be omitted and only a feature portion of the first embodiment will be described.

<Feature of the Configuration of the DC Power Supply Apparatus According to the First Embodiment>

In the first embodiment, the diode 201 is connected between the IS terminal 404(e) of the power control IC 109 and a current inflow end of the current detection resistor 114 that is a voltage detection point for current detection of the primary coil. That is, an anode of the diode 201 is connected to the current inflow end of the current detection resistor 114 and a cathode of the diode 201 as an output terminal of a current detection circuit is connected to the IS terminal 404(e) of the power control IC 109. In this way, in the DC power supply apparatus according to the first embodiment, the consumption power in the low-load state can be further reduced as compared with the DC power supply apparatus according to the related art. The reduction of the consumption power in the low-load state is realized by reducing a switching frequency of the FET 107 per unit time in the low-load state and reducing the consumption power corresponding to a switching loss.

<Operation Example of the DC Power Supply Apparatus According to the First Embodiment>

A feature of the circuit operation according to the first embodiment will be described with reference to FIGS. 2 to 6 in the order of <circuit operation in a low-load state>, <circuit operation in a normal load state>, and <circuit operation in an excessive load state>.

<Circuit Operation in a Low-Load State>

Figure 2:
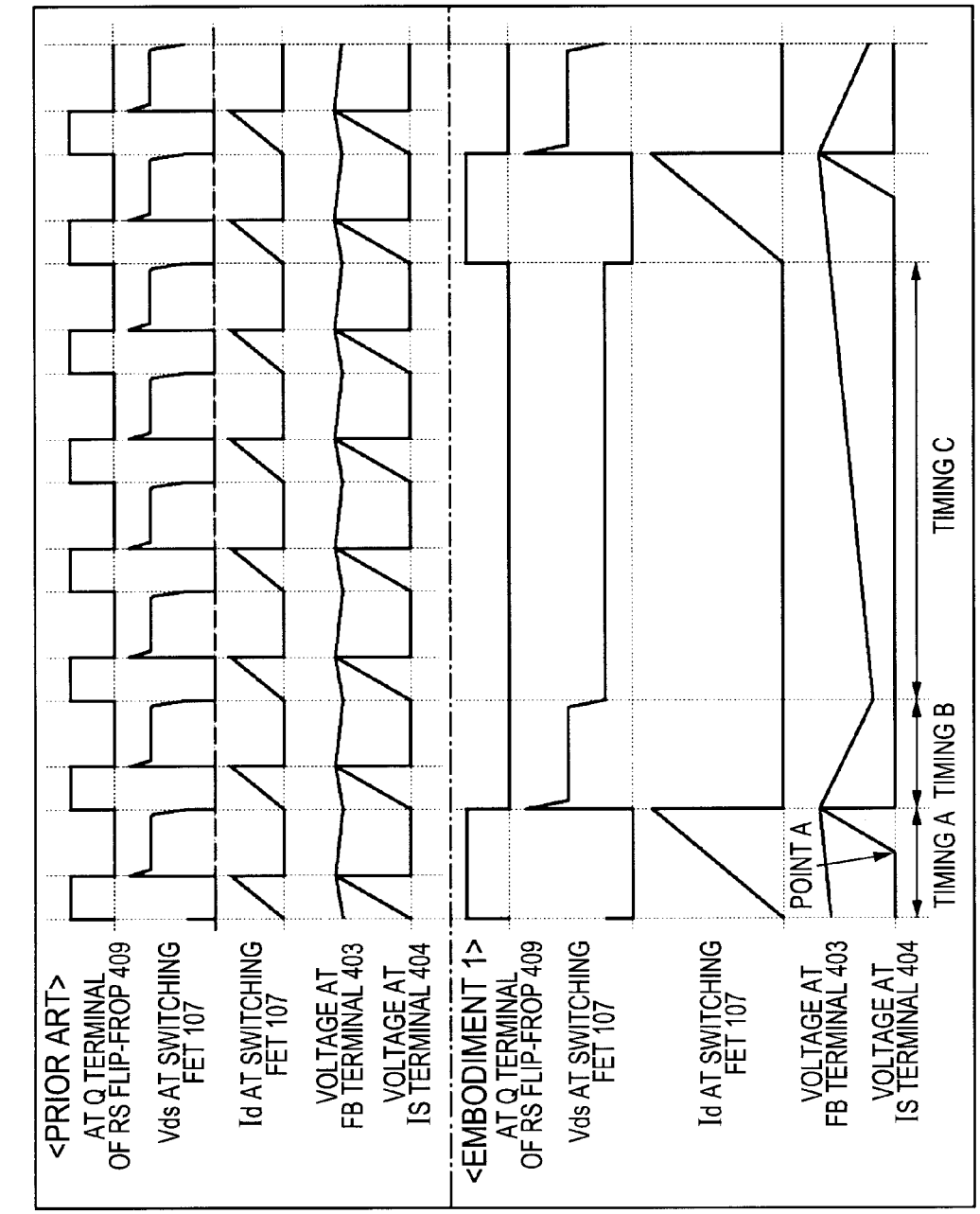
FIG. 2 is a diagram illustrating a comparison result of operation waveforms according to the related art and the first embodiment in a low-load state.

(Timing A of FIG. 2) In the low-load state, from a point of time of a point A when the voltage generated across the current detection resistor 114 exceeds the voltage Vf of the diode 201, the voltage of the IS terminal 404 starts to increase at a constant inclination. As such, the voltage of the IS terminal 404 non-linearly changes. At timing when the voltage of the IS terminal 404 increases and becomes the same voltage as the voltage of the FB terminal 403, the FET 107 enters in a non-conductive state and is turned off. In this case, using a feature of the voltage generated across the current detection resistor 114 decreasing by the voltage Vf of the diode 201 and being input to the IS terminal 404, a time needed until the switching FET 107 switches from a conductive state to a non-conductive state is increased as compared with the related art. A ratio of the time needed until the switching FET 107 enters in a non-conductive state, which is increased as compared with the related art, depends on the voltage Vf of the diode 201. For example, when the switching frequency of the FET 107 illustrated in FIG. 2 is reduced to ⅙ of the switching frequency in the DC power supply apparatus according to the related art, by the following calculation, the voltage Vf of the diode 201 is induced as follows.

In the case of the related art, $P_1 = \frac{1}{2} \times L \times I_1^2$ where $P_1$: energy that is accumulated in the transformer 108, L: an L value (common to the related art and the second embodiment) of the transformer 108, and $I_1$: Id peak of the switching FET 107).

In the case of the first embodiment, $P_2 = \frac{1}{2} \times L \times I_2^2$ where $P_2$: energy that is accumulated in the transformer 108, L: an L value (common to the related art and the second embodiment) of the transformer 108, and $I_2$: Id peak of the switching FET 107).

Accordingly, if the switching frequency is reduced to ⅙, $I_2 = (6 \times I_1)^{1/2}$ is obtained from $6 \times P_1 = P_2$. That is, the conductive time of the switching FET 107 in the first embodiment increases by $6^{1/2}$ times as compared with the related art. If the peak current of the IS terminal 404 is defined as $V_{IS}$, $Vf = (6^{1/2} - 1) \times V_{IS}$ is obtained from $1 + Vf/V_{IS} = 6^{1/2}$.

(Timing B of FIG. 2) The timing B indicates a period of time when the energy accumulated in the transformer 108 as a flyback current flows into the secondary side, after the FET 107 enters in a nonconductive state. In the first embodiment, even after all the flyback current flows, the output from the AND circuit 411 cannot become high (high level) as long as the voltage of the FB terminal 403 does not exceed the reference voltage 410. Therefore, the S terminal of the flip-flop logic circuit 409 cannot become high. For this reason, the FET 107 cannot become conductive. In this way, the switching operation is controlled such that the FET 107 maintains the non-conductive state even after all the flyback current flows, and the DC voltage output 118 is stably controlled. Even in the general power control IC, a function of monitoring the voltage of the FB terminal 403 is incorporated therein.

(Timing C of FIG. 2) The timing C indicates a period of time when the voltage of the FB terminal 403 gradually increases and exceeds the reference voltage 410 and the FET 107 enters in a conductive state again.

Figure 3:
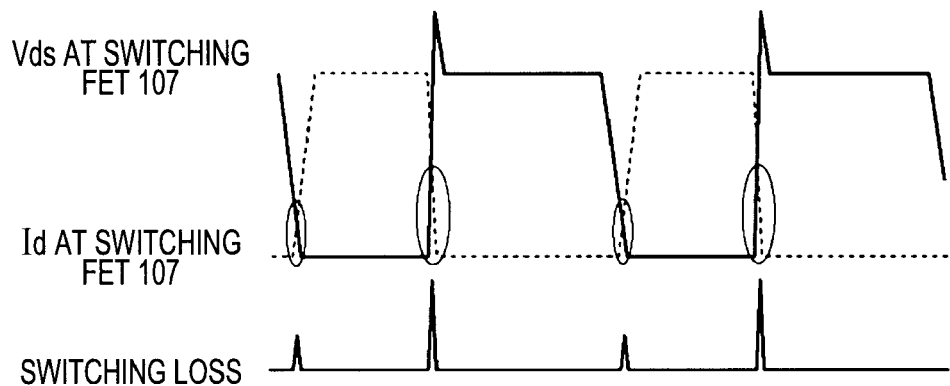
FIG. 3 is a diagram illustrating a switching loss.

In this way, as compared with the related art, the switching frequency of the FET 107 per unit time can be reduced and the switching loss can be reduced. As a result, the consumption power in the low-load state can be reduced. The outline of the switching loss is illustrated in FIG. 3. The switching loss indicates a loss that the FET 107 causes at the time of switching. That is, the switching loss means power that is obtained by multiplying the drain/source voltage Vds at the time of the switching operation and the drain current Id.

<Circuit Operation in a Normal Load State>

Next, a circuit operation in the normal load state will be described. The operation comparison is performed with reference to FIGS. 4 and 5 which illustrate the outline of the operation waveforms of the DC power supply apparatus according to the related art and the DC power supply apparatus according to the first embodiment in the normal load state.

Figure 4:
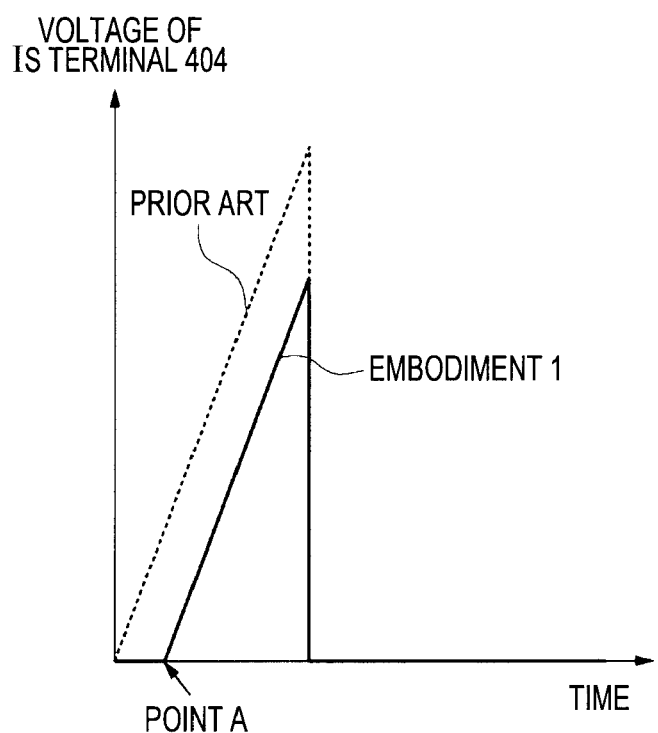
FIG. 4 is a diagram illustrating a comparison result of voltage waveforms of IS terminals 404 according to the related art and the first embodiment in a normal load state.

(Voltage of the IS terminal 404) FIG. 4 illustrates the voltage of the IS terminal 404 in one-time switching of the FET 107. In the case of the related art, the voltage increases at a constant inclination over time. Meanwhile, in the case of the first embodiment, the voltage of the IS terminal 404 is generated at an inclination from the point A of timing when the voltage exceeds the voltage Vf of the diode 201. In a range of the voltages from 0 V to the voltage of the point A, the voltage of the IS terminal 404 has no inclination. If the voltage exceeds the point A, the voltage increases at the same inclination as the inclination of the voltage transition of the IS terminal 404 according to the related art.

Figure 5A:
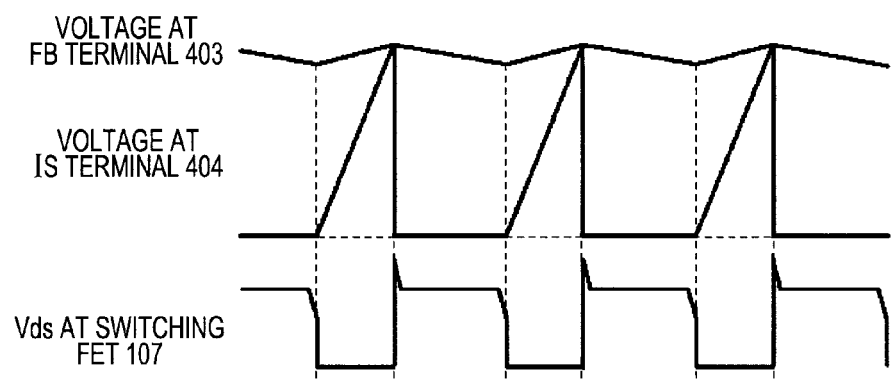
FIG. 5A is a diagram for comparison of operation waveforms according to the related art and the first embodiment in the normal load state, which illustrates the operation waveform according to the related art in the normal load state.
Figure 5B:
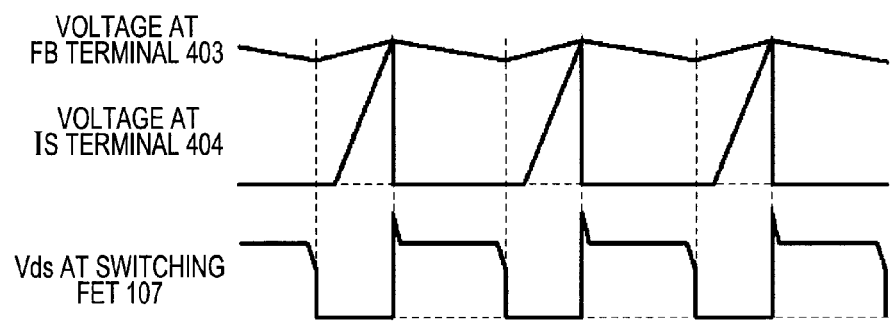
FIG. 5B is a diagram for comparison of operation waveforms according to the related art and the first embodiment in the normal load state, which illustrates the operation waveform according to the first embodiment in the normal load state.

(Voltages of the FB terminal 403 and the IS terminal 404 and Vds waveform of the switching FET) Next, FIG. 5A illustrates the voltage of the FB terminal 403, the voltage of the IS terminal 404, and the Vds waveform of the switching FET in the DC power supply apparatus according to the related art. Meanwhile, FIG. 5B illustrates the voltage of the FB terminal 403, the voltage of the IS terminal 404, and the Vds waveform of the switching FET in the DC power supply apparatus according to the first embodiment. As described in FIG. 4, the voltage waveform of the IS terminal 404 is different in the related art and the first embodiment. Meanwhile, since the voltage waveform of the FB terminal 403 changes according to the timing when the switching FET 107 enters in a non-conductive state in the related art and the first embodiment, the Vds waveform of the switching FET becomes the same waveform in the related art and the first embodiment. This reason is that the DC voltage output 118 is set to output the same voltage in the related art and the first embodiment. In this way, even in the normal load state, the voltage of the IS terminal 404 is different in the related art and the first embodiment. However, the circuit is operated such that the voltage of the FB terminal 403 changes and the same output voltage is obtained.

<Circuit Operation in an Excessive Load State>

Next, the circuit operation in the excessive load state will be described. The excessive load state described herein indicates a state of a load when the excessive load is detected and the oscillation operation of the power control IC is stopped. Similar to the related art, the excessive load is detected by the peak voltage of the IS terminal 404. When the peak voltage of the IS terminal 404 becomes a voltage that is equal to or higher than the voltage determined by the power control IC 109, the oscillation operation of the power control IC 109 can be stopped. With respect to the excessive load detection, the voltage that is obtained by subtracting the voltage Vf of the diode 201 from the voltage generated across the current detection resistor 114 is input to the IS terminal 404. Therefore, the excessive load detection is performed by the load shifted from the excessive load detection of the DC power supply apparatus according to the related art by the voltage Vf of the diode 201.

Figure 6:
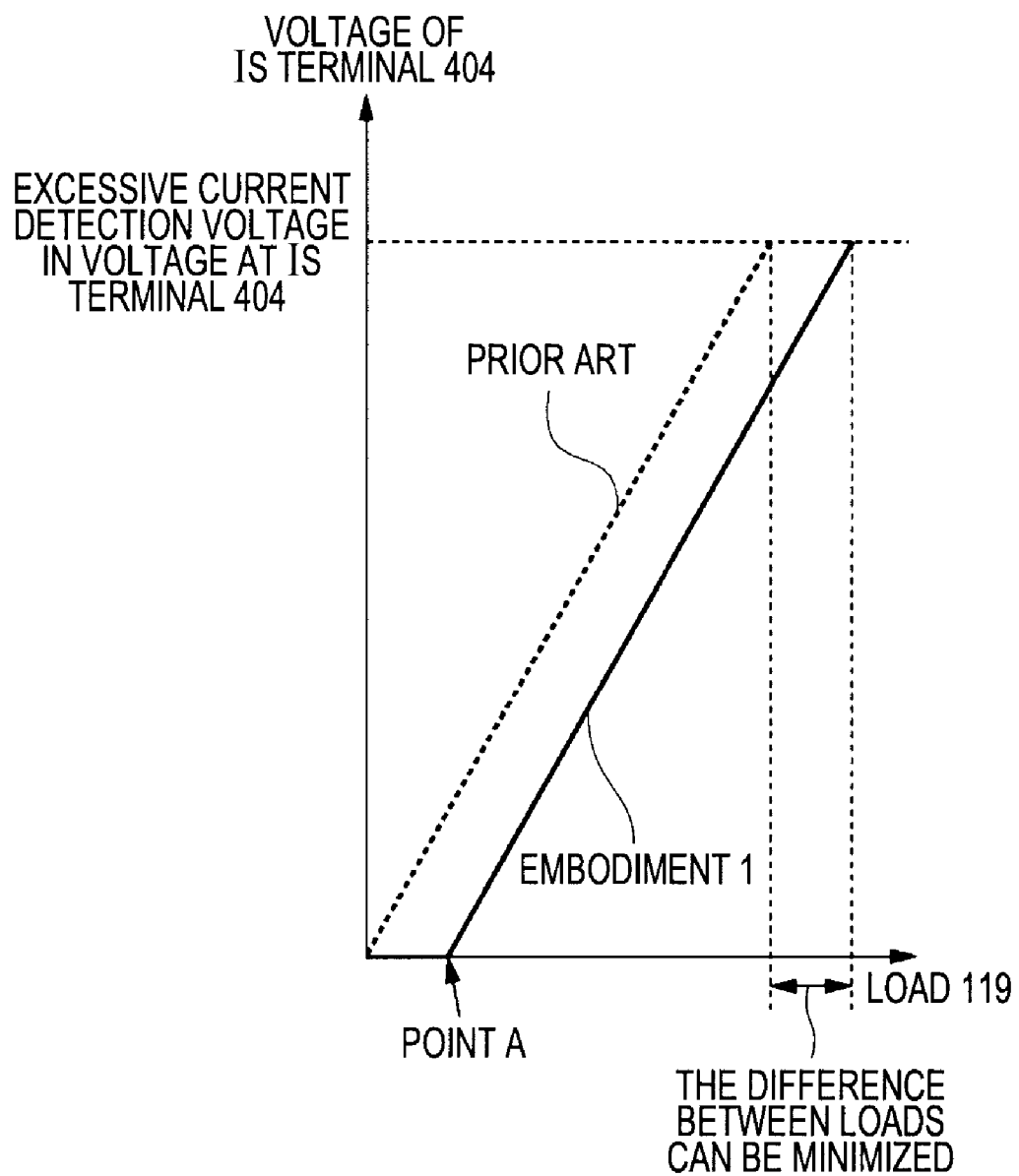
FIG. 6 is a diagram illustrating a comparison result of voltage waveforms of the IS terminals 404 according to the related art and the first embodiment in an excessive load state.

This is illustrated in FIG. 6. In FIG. 6, a horizontal axis indicates a load 119 that is connected to the DC power supply apparatus and a vertical axis indicates a peak voltage of the IS terminal 404. A difference in the excessive current detection current value between the excessive current detection in the DC power supply apparatus according to the related art and the excessive current detection in the DC power supply apparatus according to the first embodiment is corresponding to the amount in which the peak voltage of the IS terminal 404 decreases by the voltage Vf of the diode 201. The point A means that the peak voltage of the IS terminal 404 exceeds the voltage Vf of the diode 201 at the point. A graph is illustrated such the voltage increases at the same inclination from the point A, as compared with the peak voltage of the IS terminal 404 of the DC power supply apparatus in the related art.

<Effect of the First Embodiment>

As such, as compared with the related art, the consumption power can be reduced by reducing the switching loss of the FET 107 in the low-load state.

Next, a second embodiment that has a configuration based on the above configuration will be described.

Figures 7A, 7B:
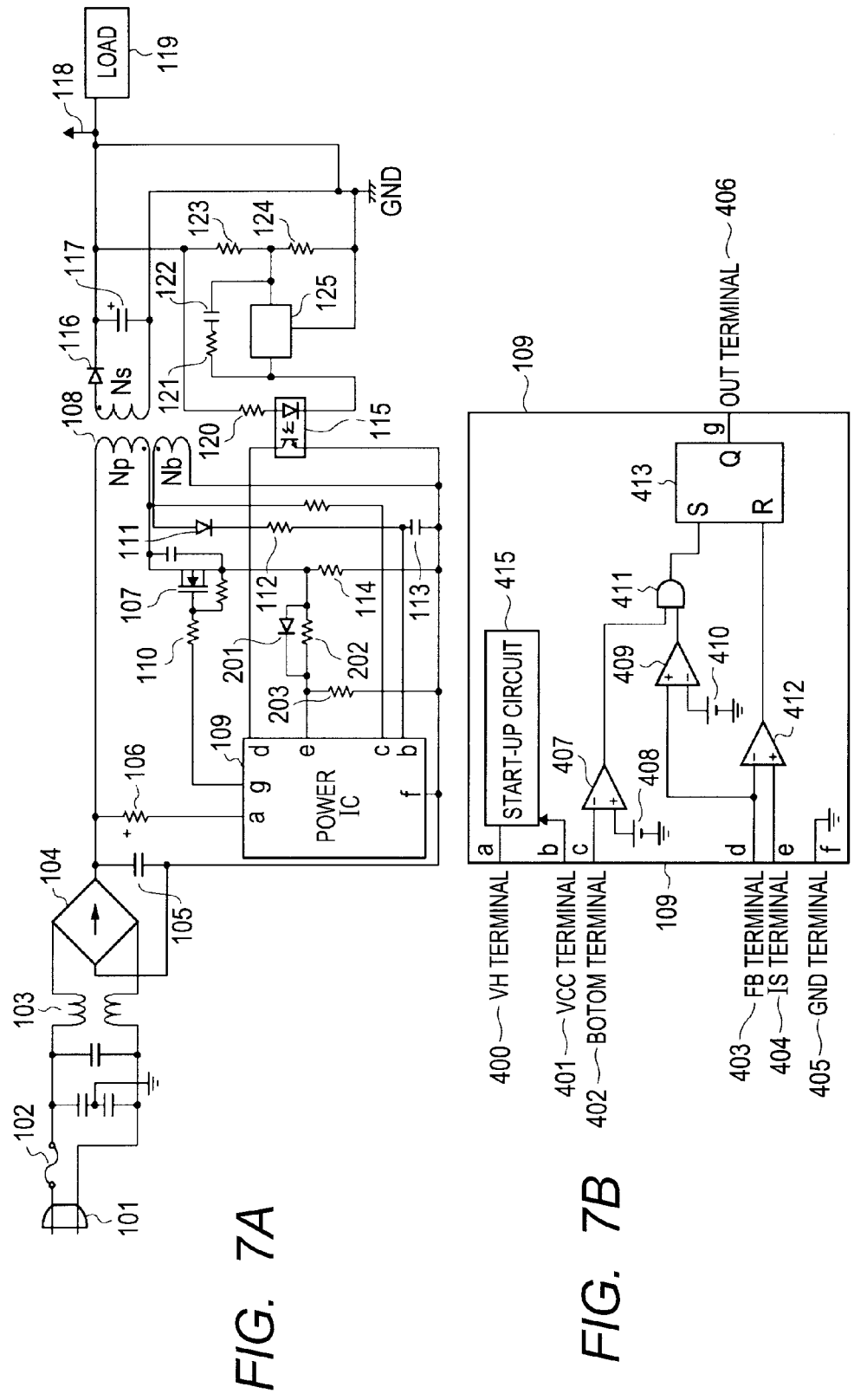
FIG. 7A is a diagram illustrating an example of a schematic circuit of a power supply apparatus according to a second embodiment, which illustrates the entire configuration of a DC power supply apparatus.
FIG. 7B is a diagram illustrating an example of a schematic circuit of the power supply apparatus according to the second embodiment, which illustrates a configuration example of a power control IC 1.

FIGS. 7A and 7B illustrate an example of the circuit configuration of a DC power supply apparatus according to the second embodiment. Specifically, FIG. 7A illustrates the entire configuration of the DC power supply apparatus and FIG. 7B illustrates a configuration example of the power control IC 109. Since the configuration of the power control IC 109 is the same as that of FIG. 12B described in the related art, the detailed description thereof will be omitted. The description of the same configuration as that of FIG. 12A will be omitted and only a feature portion of the second embodiment will be described.

<Feature of the Configuration of the DC Power Supply Apparatus According to the Second Embodiment>

The second embodiment is different from the first embodiment in that a first voltage division resistor 202 and a second voltage division resistor 203 and a diode 201 are added. The first voltage division resistor 202 and the diode 201 are connected in parallel between the IS terminal 404(e) of the power control IC 109 and a current inflow end of the current detection resistor 114 that is a voltage detection point for current detection of the primary coil. That is, an anode of the diode 201 is connected to the current inflow end of the current detection resistor 114 and a cathode of the diode 201 as an output terminal of a current detection circuit is connected to the IS terminal 404(e) of the power control IC 109. The second voltage division resistor 203 is connected between the IS terminal 404(e) of the power control IC 109 and the GND terminal 405(f). That is, the cathode of the diode 201 is connected to a connection point of the first voltage division resistor 202 and the second voltage division resistor 203. If the voltage division resistors are added, the switching time of the switching FET 107 in the low-load state can be set more minutely than the first embodiment.

<Operation Example of the DC Power Supply Apparatus According to the Second Embodiment>

A feature of the circuit operation according to the second embodiment will be described with reference to FIGS. 8 to 11 in the order of <circuit operation in a low-load state>, <circuit operation in a normal load state>, and <circuit operation in an excessive load state>.

<Circuit Operation in a Low-Load State>

Figure 8:
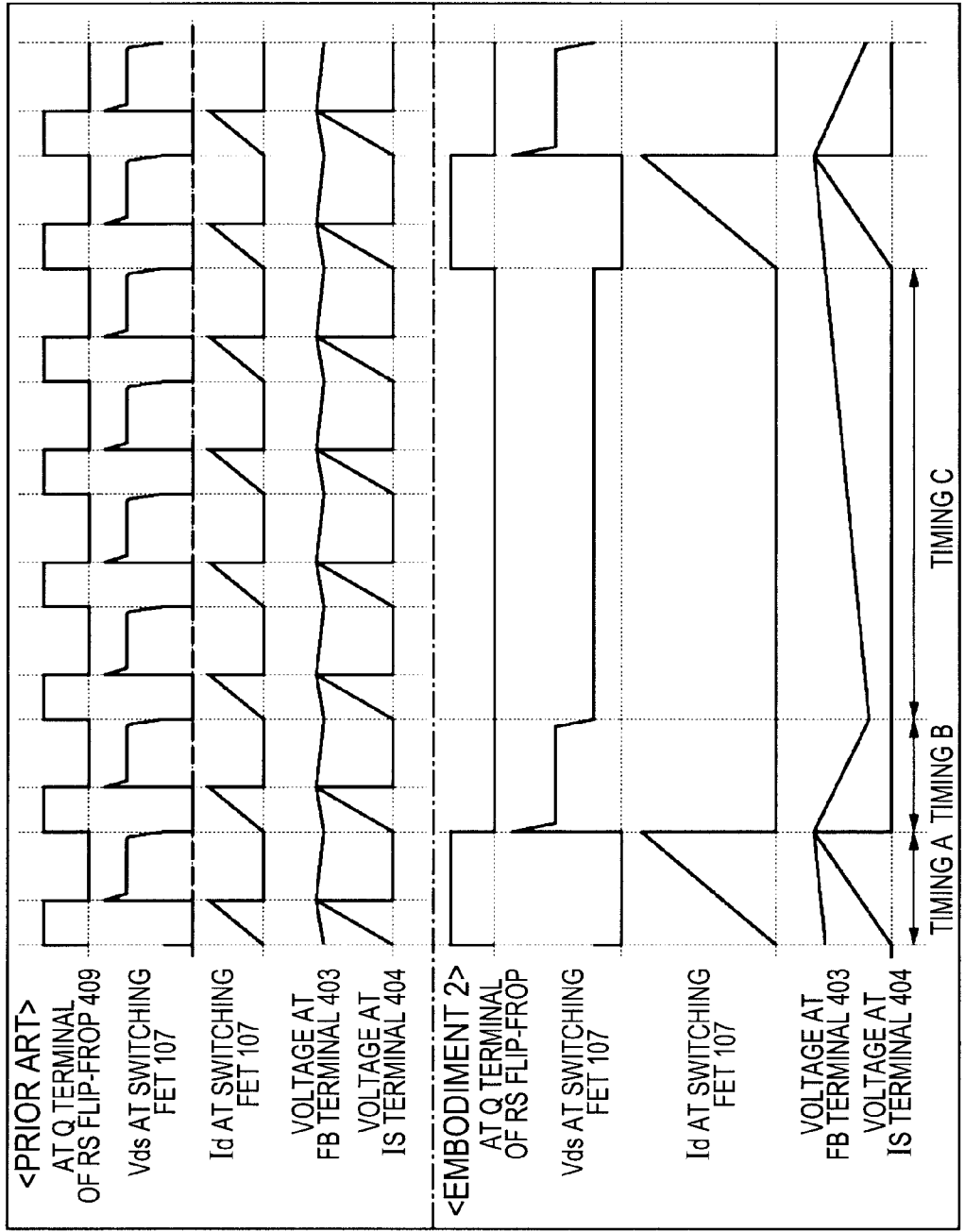
FIG. 8 is a diagram illustrating a comparison result of operation waveforms according to the related art and the second embodiment in a low-load state.

The low-load state that is described herein indicates a state where the voltage generated across the voltage division resistor 202 is lower than the voltage Vf of the diode 201. That is, the low-load state indicates a state where the DC power supply apparatus is operated at a voltage lower than $V_{IS}$ (voltage of the IS terminal 404)=(R202/R203)×Vf, if a resistance value of the voltage division resistor 202 is defined as R202 and a resistance value of the voltage division resistor 203 is defined as R203. The outline of the operation waveform of the second embodiment of which the operation waveform is compared with the operation waveform of the related art in the low-load state at synchronized timing is illustrated in FIG. 8.

(Timing A of FIG. 8) The voltage generated across the current detection resistor 114 is divided by the voltage division resistor 202 and the voltage division resistor 203 and is input to the IS terminal 404. This voltage becomes a voltage that is lower than the voltage input to the IS terminal 404 described in the related art. For this reason, since the timing when the FET 107 enters in a non-conductive state is timing when the voltage of the IS terminal 404 and the voltage of the FB terminal 403 become the same voltage as descried in the related art, the timing is delayed as compared with the related art. For example, when the switching frequency of the FET 107 illustrated in FIG. 8 is reduced to ⅙ of the switching frequency in the DC power supply apparatus according to the related art, a voltage division ratio of the voltage division resistor 202 and the voltage division resistor 203 may be determined by the following calculation.

In the case of the related art, $P_1 = \frac{1}{2} \times L \times I_1^2$ where $P_1$: energy that is accumulated in the transformer 108, L: an L value (common to the related art and the first embodiment) of the transformer 108, and $I_1$: Id peak of the switching FET 107.

In the second embodiment, $P_2 = \frac{1}{2} \times L \times I_2^2$ where $P_2$: energy that is accumulated in the transformer 108, L: an L value (common to the related art and the first embodiment) of the transformer 108, and $I_2$: Id peak of the switching FET 107.

Accordingly, in order to reduce the switching frequency to ⅙, $I_2 = 6^{1/2} \times I_1$ is obtained from $6 \times P_1 = P_2$. That is, the voltage division ratio of the voltage division resistors may be determined such that the peak current of $6^{1/2}$ times flows. When a resistance value of the voltage division resistor 202 is defined as R1 and a resistance value of the voltage division resistors 203 is defined as R2, a resistance ratio $R1:R2 = (6^{1/2} - 1):1$ is obtained. If this circuit operation is set, the switching loss of the circuit according to the second embodiment becomes ⅙ of the switching loss of the circuit according to the related art.

(Timing B of FIG. 8) The timing B indicates a period of time when the energy accumulated in the transformer 108 as a flyback current flows into the secondary side, after the switching FET 107 enters in a non-conductive state. In the second embodiment, even after all the flyback current flows, the output from the AND circuit 411 cannot become high as long as the voltage of the FB terminal 404 does not exceed the reference voltage 410. For this reason, since the S terminal of the flip-flop logic circuit 409 cannot become high, the switching FET 107 cannot become conductive. In this way, the switching operation is controlled such that the switching FET 107 maintains the non-conductive state even after all the flyback current flows, and the DC voltage output 118 is stably controlled. In the general power control IC, a function of monitoring the voltage of the FB terminal 403 is incorporated therein.

(Timing C of FIG. 8) The timing C indicates a period of time when the voltage of the FB terminal 403 gradually increases and exceeds the reference voltage 410, so that the switching FET 107 enters in a conductive state again.

<Circuit Operation in a Normal Load State>

Next, a circuit operation in the normal load state will be described. The normal load state indicates a state where a peak value of the voltage generated across the resistor 202 is higher than the voltage Vf of the diode 201. That is, the normal load state indicates a state where the DC power supply apparatus is operated at a peak voltage higher than $V_{IS}$ (voltage of the IS terminal 404)=(R202/R203)×Vf, if a resistance value of the voltage division resistor 202 is defined as R202 and a resistance value of the voltage division resistor 203 is defined as R203.

Figure 10A:
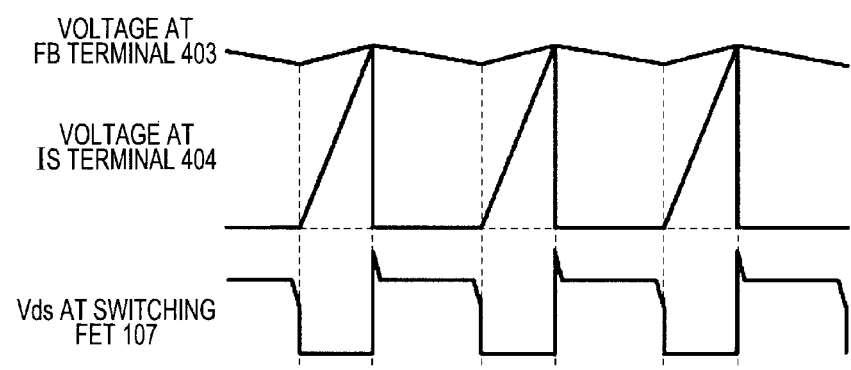
FIG. 10A is a diagram for comparison of operation waveforms according to the related art and the second embodiment in the normal load state, which illustrates the operation waveform according to the related art in the normal load state.
Figure 10B:
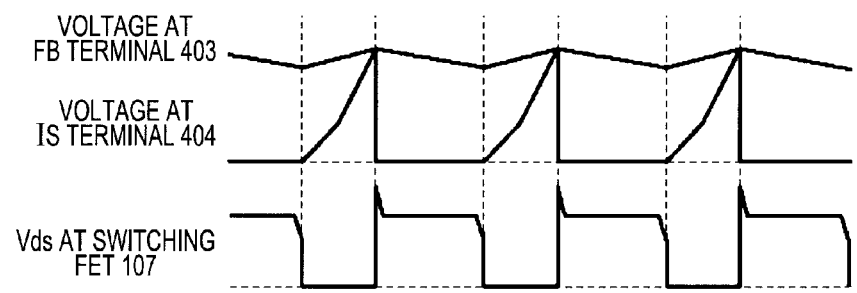
FIG. 10B is a diagram for comparison of operation waveforms according to the related art and the second embodiment in the normal load state, which illustrates the operation waveform according to the second embodiment in the normal load state.

In FIGS. 9 to 10B, the outline of the operation waveforms of the DC power supply apparatus according to the related art and the DC power supply apparatus according to the first embodiment in the normal load state is illustrated, and an operation comparison is performed.

(Voltage of the IS terminal 404) FIG. 9 illustrates the voltage of the IS terminal 404 in one-time switching of the switching FET 107. In the case of the related art, the voltage increases at a constant inclination over time. Meanwhile, in the case of the second embodiment, the inclination changes at the point B where the voltage of the IS terminal 404 exceeds the calculated voltage $V_{IS}$=(R202/R203)×Vf. In a range of the voltages from 0 V to the voltage of the point B, the voltage transits with a ratio of R203/(R202+R203) that corresponds to the inclination moderated more than the inclination of the voltage transition of the IS terminal 404 of the related art. When the voltage exceeds the point B, the voltage increases at the same inclination as the inclination of the voltage transition of the IS terminal 404 according to the related art. As such, the voltage of the IS terminal 404 non-linearly changes (inclination changes halfway).

(Voltages of the FB terminal 403 and the IS terminal 404 and Vds waveform of the switching FET) Next, FIG. 10A illustrates the voltage of the FB terminal 403, the voltage of the IS terminal 404, and the Vds waveform of the switching FET in the DC power supply apparatus according to the related art. Meanwhile, FIG. 10B illustrates the voltage of the FB terminal 403, the voltage of the IS terminal 404, and the Vds waveform of the switching FET in the DC power supply apparatus according to the second embodiment. As described in FIG. 9, the voltage waveform of the IS terminal 404 is different in the related art and the second embodiment. Meanwhile, since the voltage waveform of the FB terminal 403 changes according to the timing when the switching FET 107 enters in a non-conductive state in the related art and the second embodiment, the Vds waveform of the switching FET becomes the same waveform in the related art and the second embodiment. This reason is that the DC voltage output 118 is set to output the same voltage in the related art and the second embodiment. In this way, even in the normal load state, the voltage of the IS terminal 404 is different in the related art and the second embodiment. However, the circuit is operated such that the voltage of the FB terminal 403 changes and the same output voltage is obtained.

<Circuit Operation in an Excessive Load State>

Next, the circuit operation in the excessive load state will be described. The excessive load state described herein indicates a state of a load when the excessive load is detected and the oscillation operation of the power control IC is stopped. Similar to the related art, the excessive load is detected by the peak voltage of the IS terminal 404. When the peak voltage of the IS terminal 404 becomes a voltage that is equal to or higher than the voltage determined by the power control IC 109, the oscillation operation of the power control IC 109 can be stopped.

Meanwhile, in the second embodiment, as described in <circuit operation in a low-load state> above, the voltage generated across the current detection resistor 114 is divided by the voltage division resistors 202 and 203 and is input to the IS terminal 404. For this reason, the voltage of the IS terminal 404 does not enable the excessive load detection when the load does not become the load higher than the load in the excessive load detection in the DC power supply apparatus described in the related art. For example, as in the second embodiment, when the voltage of the IS terminal becomes $(\frac{1}{6})^{1/2}$ as compared with the related art, the excessive current detection current value may become $6^{1/2}$ times. Accordingly, in the second embodiment, in order to resolve this problem, the diode 201 is additionally provided. The outline of the operation of the circuit where the diode 201 is additionally provided is described.

In the DC power supply apparatus according to the second embodiment, when the load 119 increases, the voltage generated across the current detection resistor 114 increases. When the voltage exceeds the voltage Vf of the diode 201, the voltage generated across the current detection resistor 114 is decreased by the voltage Vf of the diode 201 through the diode 201 and is input to the IS terminal 404. For this reason, the voltage generated across the current detection resistor 114 is not divided by the voltage division resistors 202 and 203. In this way, the excessive load detection that is matched to the excessive current detection current value of the DC power supply apparatus described in the related art more than the case where the voltage generated across the current detection resistor 114 is divided by the voltage division resistors 202 and 203 can be performed.

Figure 11A:
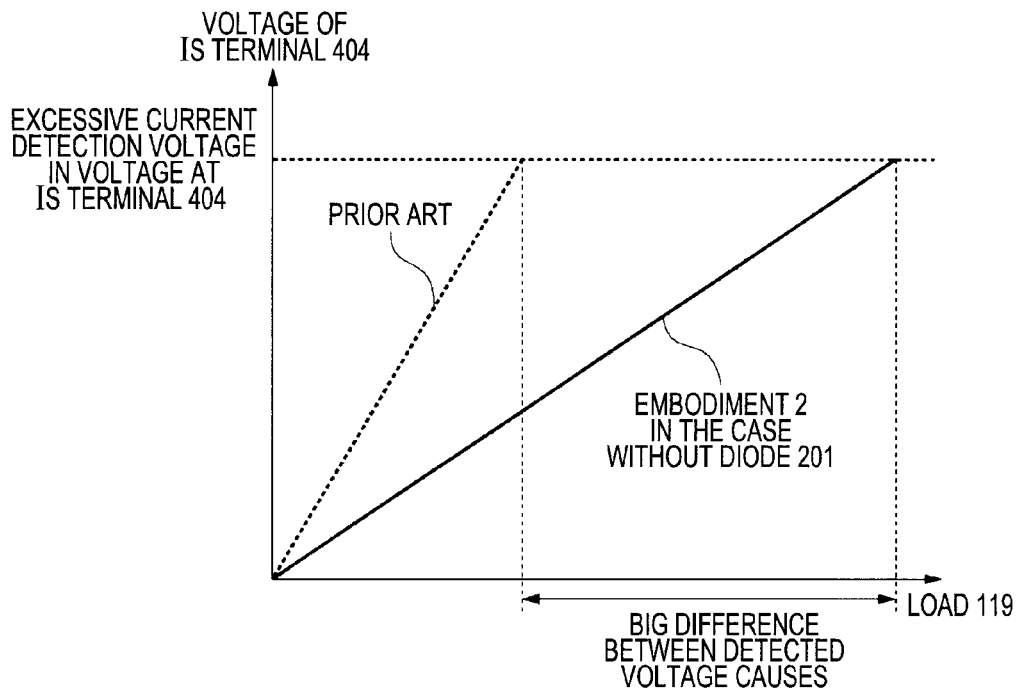
FIG. 11A is a diagram for comparison of voltages of the IS terminals 404 based on existence or non-existence of a diode 201 in the second embodiment, which illustrates a difference generated in an excessive current detection current value as compared with the related art, when the diode 201 does not exist.
Figure 11B:
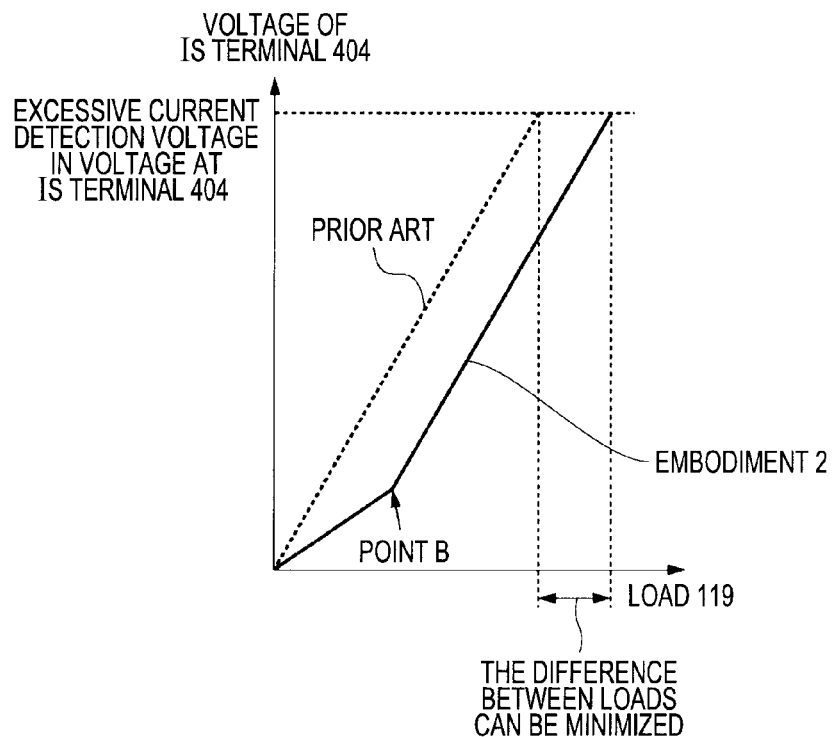
FIG. 11B is a diagram for comparison of voltages of the IS terminals 404 based on existence or non-existence of the diode 201 in the second embodiment, which illustrates a difference generated in an excessive current detection current value as compared with the related art, when the diode 201 exists.

The comparison result is illustrated in FIGS. 11A and 11B. FIG. 11A illustrates a difference in the excessive current detection current value as compared with the related art, if the diode 201 does not exist. In FIG. 11A, a horizontal axis indicates a load 119 that is connected to the DC power supply apparatus and a vertical axis indicates a peak voltage of the IS terminal 404. The case where the excessive current detection is performed in the DC power supply apparatus according to the related art and the case where the voltage of the IS terminal 404 is divided such that the voltage is reduced to $(\frac{1}{6})^{1/2}$ are compared. In this case, in the excessive current detection current value, a difference of $6^{1/2}$ times may be generated.

Next, FIG. 11B illustrates a difference in the excessive current detection current value as compared with the related art, when the diode 201 exists. In FIG. 11B, a horizontal axis indicates a load 119 and a vertical axis indicates a peak voltage of the IS terminal 404, similar to the FIG. 11A. The case where the excessive current detection is performed in the DC power supply apparatus according to the related art and the case where the voltage of the IS terminal 404 is divided such that the voltage is reduced to $(\frac{1}{6})^{1/2}$ and the diode exists are compared. In this case, a difference in the excessive current detection current value is corresponding to the amount in which the voltage of the IS terminal 404 decreases by the voltage Vf of the diode 201. The point B indicates that the voltage generated across the current detection resistor 114 exceeds the voltage Vf of the diode 201. Since the voltage generated across the current detection resistor 114 is not divided by the voltage division resistors 202 and 203 at the point B, the inclination of the graph changes. As such, the voltage of the IS terminal 404 non-linearly changes. As described above, effectiveness of when the diode 201 exists can be described with FIGS. 11A and 11B.

<Effect of the Second Embodiment>

As such, in the second embodiment, as compared with the related art, the consumption power can be reduced by reducing the switching loss of the FET 107 in the low-load state. Further, even when the excessive current detection current is shifted, the excessive current detection can be securely performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-069008, filed Mar. 19, 2009, which is hereby incorporated by reference herein in its entirety.

What is claimed is:

1. A DC power supply apparatus comprising:
    a transformer;
    a switching part that controls a current flowing through a primary coil of the transformer;
    a current detection part that detects the current flowing through the primary coil of the transformer;
    a voltage output part that rectifies and smoothes a voltage of a secondary coil of the transformer and outputs the voltage;
    a detection part that detects a regeneration termination of the secondary coil;
    a comparison part that compares an output voltage from the voltage output part and a reference voltage and outputs a signal according to the comparison result;
    a control part that turns on the switching part based on the detection result of the detection part and an output from the comparison part and turns off the switching part based on an output from the current detection part and the output from the comparison part; and
    a switching operation control part that is provided between the current detection part and the control part and controls the operation of the switching part according to the output voltage.

2. A DC power supply apparatus of claim 1, further comprising:
    a transmission part that transmits a signal output from the comparison part to a control circuit,
    wherein the control part turns on the switching part, when the regeneration termination of the secondary coil is detected by the detection part and the output from the transmission part is a predetermined value or higher, and turns off the switching part, when the output from the current detection part exceeds the output from the voltage output part.

3. The DC power supply apparatus of claim 1, wherein the current detection part is a current detection resistor,
    the switching operation control part is a diode, and
    an anode of the diode is connected to a current inflow end of the current detection resistor and a cathode of the diode is connected to the control part.

4. The DC power supply apparatus of claim 1, wherein the current detection part is a current detection resistor,
    the switching operation control part includes first and second voltage division resistors that divide a voltage of the current detection resistor, and a diode, and
    an anode of the diode is connected to a current inflow end of the current detection resistor, and a cathode of the diode is connected to a connection point of the first and second voltage division resistors and connected to the control part.

* * * * *